H. P. HARSHA.
GAME APPARATUS.
APPLICATION FILED NOV. 15, 1920.
1,416,556.
Patented May 16, 1922.
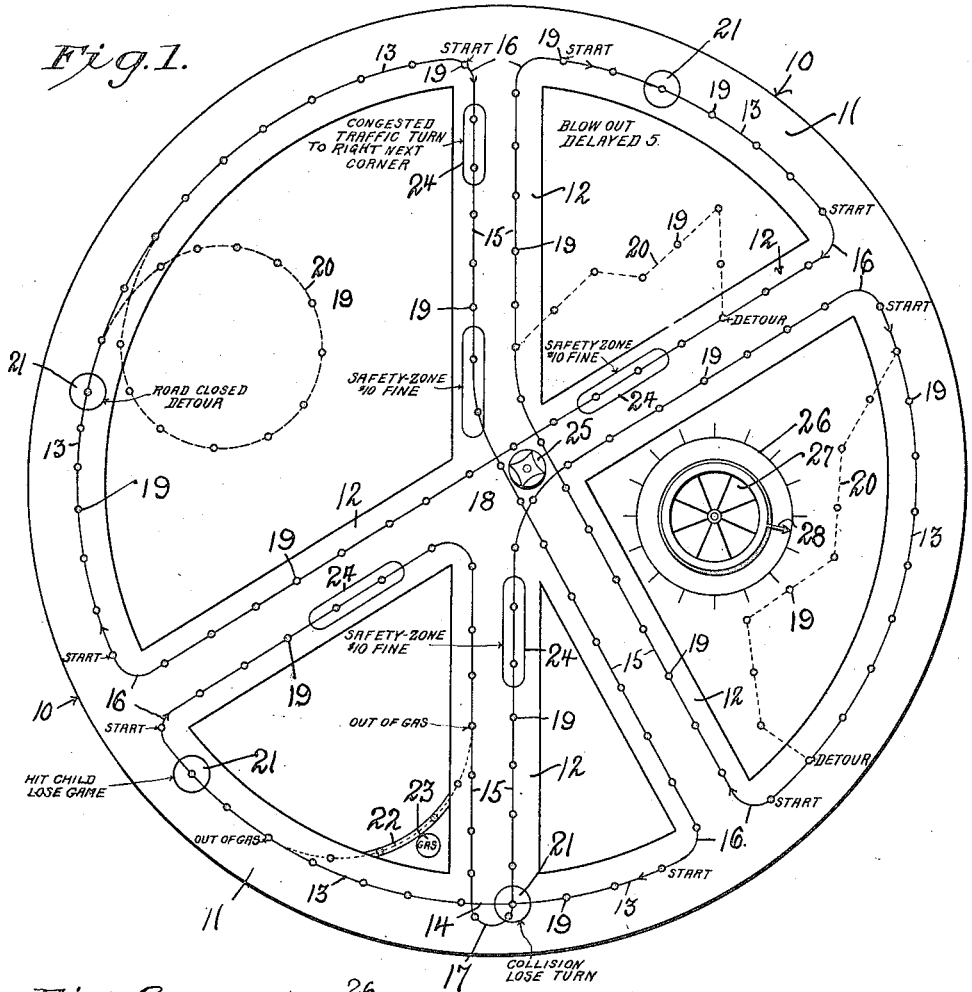
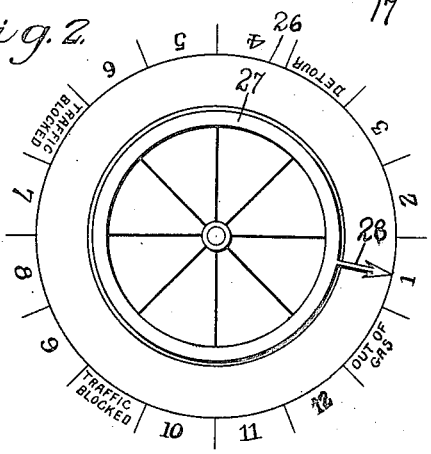
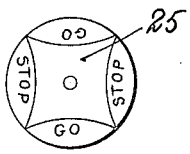
Inventor
H. P. Harsha,
By Geo. P. Kimmel
Attorney

UNITED STATES PATENT OFFICE.

HORATIO PAUL HARSHA, OF DETROIT, MICHIGAN.

GAME APPARATUS.

1,416,556. Specification of Letters Patent. Patented May 16, 1922.

Application filed November 15, 1920. Serial No. 424,095.

*To all whom it may concern:*

Be it known that I, HORATIO PAUL HARSHA, a citizen of the United States, residing at Detroit, in the county of Wayne and State of Michigan, have invented certain new and useful Improvements in Game Apparatus, of which the following is a specification.

This inveniton relates to game apparatus and has for one of its objects to provide an apparatus in which the various details are designed to represent the movements of automobiles over the road, and wherein the players in addition to being amused are instructed in the rules and regulations governing automobile traffic, and the ordinary conditions encountered upon roads over which the vehicle travels.

With these and other objects in view, the invention consists in certain novel features of construction as hereinatfer shown and described and then specifically pointed out in the claim, and in the drawings illustrative of the preferred embodiment of the invention.

Figure 1 is a plan view of the game board.

Fig. 2 is a plan view of the indicator whereby the "moves" of the players is controlled.

Fig. 3 is a plan view of the route indicator.

Fig. 4 represents perspective views of the "automobiles" or men employed by the players, preferably of different colors or marks to distinguish them.

The game board 10 is shown in circular form but may be of any form desired, and has depicted thereon an outer circular outline 11 and intersecting radially disposed outlines 12, intersecting centrally of the board and communicating with the circular outline at their outer ends except at one point 14.

Depicted within the circular outline 11 are segmental lines 13 terminating at their ends adjacent the outer terminals of the outlines 12, and likewise depicted within the radial outlines 12 are spaced lines 15 connected by curvatures 16 with the segmental lines 13 except at the point 14 where the lines 15 are connected by a semicircular line 17.

The lines 15 cross each other centrally of the board as shown at 18. Starting at the left at the upper side of the board, at the word Start, it will be noted that the lines 15 and connections 16 and 17 are continuous.

Located upon the lines 15, curved connection 17, and certain of the curved connections 16, are circular marks 19 at uniformly spaced intervals.

At several points dotted lines 20 are depicted connected at their ends to the main lines 15 at the marks 19, and provided with like spaced marks 19.

At several points on the segmental lines 15 certain of the marks 19 are surrounded by circular lines 21

At one point one of the radial lines 15 and one of the segmental lines 13 are connected by a segmental line 22 having a plurality of the spaced marks 19, and located adjacent the line 22 is a small circle 23 marked Gas, and denoting a gasoline tank or station.

At intervals on the lines 15 are elongated round ended figures 24 variously marked, for instance, "Congested traffic, turn to right next corner," "Safety zone $10 fine," while the small circles 21 are also variously marked, "Blow-out, delayed 5," "Road closed. Detour," "Hit child, lose game," "Collision, lose turn."

The marks 19 at the ends of the line 22 are marked Out of gas, while the marks 19 at the ends of the lines 20 are marked Detour.

Disposed centrally of the board 10 is a revolving member 25 divided into four sections with the word Go on two diametrically opposite sections and the word Stop on the other two sections, as shown in Fig. 3, which represents this rotative member detached and enlarged.

The outlines 12 are designed to represent streets and the member 25 represents the signal device employed by the traffic policeman at street crossings.

Located upon any convenient portion of the board 10 is a graduated ring 26 with the graduations numbered consecutively and denoting words such as Detour, Traffic blocked, Out of gas, etc., between certain of the graduations and taking the place of the same.

Mounted for rotation within the cricle or ring 26 is a disk 27 having a pointer or finger 28 at one point operating in conjunction with the graduations.

A plurality of counters or men, represented at 29, are employed, one for each player, and preferably of different colors, as indicated in Fig. 4.

The game is played as follows.

One of the men or autos or counters 29 is issued to each player, and the first player deposits his counter on one of the marks 19 at one of the words "Start." The player then rotates the member 27 rapidly and allows it to come to a stop, noting the graduation at which it stops, and moves his "auto" over an equal number of the marks 19. If the finger 28 stops at the graduation 2 or 3, the player must turn to the right at the next "crossing." If the finger stops at a numeral greater than 3, for instance, he moves past the figure marked "Congested traffic, turn to right next corner."

If the finger 28 stops at the numeral 7 or 8, the pointer will be moved into the figure marked "Safety zone," which requires the player to pay a "fine" of $10—or move back 10 "points" or over 10 of the marks 19.

If the pointer 28 stops at a larger number on the ring 26, then the "man" is moved accordingly and escapes the "fine" above noted, and so on around the lines, being governed in his progress by the conditions noted.

After the first player has completed his first "move," the second player deposits his "man" or "auto" on one of the marks or "stations" marked "Start" and rotates the indicator 27 and proceeds in the same manner as the first player and so on until all the players have made one "move" when the first player makes his second move, and so on until all the players have completed the circuit and overcome all the "obstructions" or conditions of the traffic. The player who first completes the circuit wins the "game."

If in the course of the "moves" the counter or "auto" ends at the mark 19 at the entrance to one of the "detours" the player must follow the detour line at the next move, or if his auto ends at the mark 19 at the end of the line 22, which denotes that his "auto" is out of "gasoline," he must move along the line 22 at his next move.

If one of the moves of an "auto" ends at the mark 19 within the circle marked "Hit child," the player loses the game and retires.

The general rules governing the game are as follows:

"The object of this game is to drive your auto around the course, pass the various hazards, and return to the starting point before your friends.

1. Each player puts his auto on one of the points marked "Start."
2. Set the "Stop and go" sign in position.
3. The first player spins the spinner and sets his auto ahead the number of spaces indicated by the pointer then the second player spins and so on until all have played.
4. When all have played the stop and go sign is turned and the players proceed as before.
5. Any auto stopping in a safety zone or other hazard is fined (set back) the amount indicated thereon.
6. Any auto passing a corner when the sign is set against it is fined 10 from the stopping point.
7. Any auto getting more than 10 on the spin is fined 10 for speeding.
8. Any auto getting less than "3" is fined for parking too long.
9. Any auto stopping on an "Out of gas" space must go by the gas station."

The formation on the board 10 denotes a plurality of streets and street crossings and a road over which automobiles travel with characters and outlines denoting the usual conditions met with by the autoist, and will also interest and amuse the players but will also impart valuable information regarding the proper way to operate an automobile.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

A game comprising a board having depicted thereon a circular outline and intersecting and communicating radial outlines, denoting streets, a street crossing and a roadway, a continuous main line upon said outlines crossing centrally of the board, and divided by marks uniformly spaced, one or more branch lines deflected from the main lines and connected at the ends thereto, figures at intervals on the main lines adapted to denote various traffic conditions, and a plurality of figures denoting counters to be moved over said lines.

In testimony whereof, I affix my signature hereto.

HORATIO PAUL HARSHA.